United States Patent
Fennessey et al.

(10) Patent No.: US 11,000,979 B2
(45) Date of Patent: May 11, 2021

(54) PROCESS TO RECYCLE EXPANDABLE PLASTIC MATERIALS AND AN EXPANDABLE OR EXPANDED PLASTIC MATERIAL OBTAINABLE THEREBY

(71) Applicant: Sulzer Chemtech AG, Winterthur (CH)

(72) Inventors: Sian Frances Fennessey, Winterthur (CH); Philip Nising, Oetwil am See (CH); Jörg Weber, Münchwilen (CH); Jan Lippuner, Buchs (CH)

(73) Assignee: Sulzer Management AG, Winterthur (CH)

( * ) Notice: Subject to any disclaimer, the term of this patent is extended or adjusted under 35 U.S.C. 154(b) by 983 days.

(21) Appl. No.: 15/120,988

(22) PCT Filed: Nov. 6, 2014

(86) PCT No.: PCT/EP2014/073931
§ 371 (c)(1),
(2) Date: Aug. 23, 2016

(87) PCT Pub. No.: WO2015/135604
PCT Pub. Date: Sep. 17, 2015

(65) Prior Publication Data
US 2016/0375616 A1    Dec. 29, 2016

(30) Foreign Application Priority Data
Mar. 10, 2014 (EP) .................... 14158542

(51) Int. Cl.
*B29C 44/34* (2006.01)
*B29C 44/42* (2006.01)
(Continued)

(52) U.S. Cl.
CPC .......... *B29C 44/3461* (2013.01); *B29B 7/748* (2013.01); *B29B 7/7485* (2013.01);
(Continued)

(58) Field of Classification Search
CPC .................................................. B29B 17/0036
See application file for complete search history.

(56) References Cited

U.S. PATENT DOCUMENTS 4,036,794 A   7/1977 Keppler et al.
4,243,717 A   1/1981 Gahmig
(Continued)

FOREIGN PATENT DOCUMENTS

CN   1112481 A   11/1995
CN   1833850 A   9/2006
(Continued)

OTHER PUBLICATIONS

Hansen, F. "Plastic Extrusion Technology", China Light Industry Press, 12.6.3, Filter Changers, pp. 336-337, Jan. 31, 2001.
(Continued)

*Primary Examiner* — Stella K Yi
(74) *Attorney, Agent, or Firm* — Larson & Anderson, LLC (57) ABSTRACT

A process is disclosed to recycle and/or formulate expandable plastic materials using a system (1) comprising: an extruder unit (10), a mixer-heat exchanger unit (20), said process comprising the steps of: melting in the extruder unit (10), cooling in the mixer-heat exchanger unit (20), and controlling the melt pressure by means of a melt pump unit (50), followed by granulation, extrusion, or injection molding, wherein a first expansion agent (81) is not degassed during a melt processing in the system (1) such that it is substantially contained in the granulated expandable plastic material (130) or used to form either the extruded, formed and expanded plastic material (140) or the molded expanded plastic article (150). The present invention also relates to a granulated expandable plastic material (130), an extruded,
(Continued)

formed and expanded plastic material (140), and a molded expanded plastic article (150) obtainable by said process.

19 Claims, 4 Drawing Sheets

(51) Int. Cl.
- *B29C 44/50* (2006.01)
- *B29B 7/74* (2006.01)
- *B29B 9/06* (2006.01)
- *B29K 105/26* (2006.01)
- *B29K 105/04* (2006.01)
- *B29K 25/00* (2006.01)
- *B29B 17/00* (2006.01)

(52) U.S. Cl.
CPC ............ *B29B 9/06* (2013.01); *B29B 9/065* (2013.01); *B29C 44/3442* (2013.01); *B29C 44/42* (2013.01); *B29C 44/50* (2013.01); *B29C 44/505* (2016.11); *B29C 44/507* (2016.11); *B29B 17/00* (2013.01); *B29K 2025/06* (2013.01); *B29K 2105/048* (2013.01); *B29K 2105/26* (2013.01); *Y02W 30/62* (2015.05)

(56) References Cited

U.S. PATENT DOCUMENTS

| | | |
|---|---|---|
| 4,606,873 A | 8/1986 | Biglione et al. |
| 4,618,468 A | 10/1986 | Rigler et al. |
| 5,000,891 A | 3/1991 | Green |
| 5,672,304 A | 9/1997 | Keilert et al. |
| 6,310,109 B1 | 10/2001 | Gluck et al. |
| 7,625,953 B2 | 12/2009 | Nising |
| 7,825,165 B2 | 11/2010 | Ghidoni et al. |
| 7,855,237 B2 | 12/2010 | Nising |
| 8,173,714 B2 | 5/2012 | Datko et al. |
| 8,535,585 B2 | 9/2013 | Casalini et al. |
| 9,447,273 B2 | 9/2016 | Casalini et al. |
| 2005/0156344 A1 | 7/2005 | Dietzen et al. |
| 2006/0211780 A1 | 9/2006 | Passaplan et al. |
| 2008/0249199 A1 | 10/2008 | Nising |
| 2014/0066558 A1 | 3/2014 | Keilert |

FOREIGN PATENT DOCUMENTS

| | | | |
|---|---|---|---|
| CN | 101186084 | A | 5/2008 |
| CN | 101678565 | A | 3/2010 |
| DE | 19708986 | A1 | 9/1998 |
| DE | 102007050681 | A1 | 4/2009 |
| EP | 0445847 | A2 | 9/1991 |
| EP | 1752236 | B1 | 10/2008 |
| GB | 1082875 | * | 9/1967 |
| GB | 1082875 | A | 9/1967 |
| JP | 10-231327 | A | 9/1998 |
| JP | 2008-069289 | A | 3/2008 |
| WO | 03/053651 | A1 | 7/2003 |
| WO | 2014/009145 | A1 | 1/2014 |

OTHER PUBLICATIONS

Xiwen, L. "Plastic Extrusion Work", Intermediate, Advanced Training Course, Printing Industry Press, 3, Expandable polystyrene, pp. 25, Jan. 31, 2013.

Schwartz, O et al. Pererabotka plastmass, Sankt-Peterburg, Professiya, 2005, pp. 51-55, 79, 188-192.

Runli, J. "New Technology for Plastic Molding", National Defense Industry Pres, 315 Melt Pump, pp. 116-117, Oct. 31, 2006.

\* cited by examiner

PROCESS TO RECYCLE EXPANDABLE PLASTIC MATERIALS AND AN EXPANDABLE OR EXPANDED PLASTIC MATERIAL OBTAINABLE THEREBY

BACKGROUND OF THE INVENTION

The present invention relates to a process to recycle and/or formulate expandable plastic materials. The present invention also relates to a recycled and/or formulated expandable or expanded plastic material obtainable thereby.

Expanded plastics have been known for a long time and have proven useful in many fields. Such foams may be produced by foaming polyethylene, polypropylene, polyester or polystyrene granulates impregnated with expansion agents and the subsequent welding together of the foam granulates produced in this way to give moldings. Expandable Polystyrene is typically known as EPS. Important fields of use of EPS and other expandable plastics include thermal insulation in building and construction, containers, cups or packaging or reinforced panels or acoustic barriers in building and construction.

However an increasing concern in recent years is the efficient disposal or recycle of expandable or expanded plastic waste. The main problems associated with the recycling of post-consumer EPS waste are the high specific transport costs due to very low bulk density, and the low value-creation due to the poor effectiveness of the purification and the poor economic viability. For that reason, the main fraction of the waste is thermally recycled.

For EPS producers, as well as prefoamers and molders, it would be useful to have a process for the reprocessing of off-spec material (e.g. too small or too large impregnated pellets) or to upgrade EPS produced by the suspension method in order to readily upgrade an EPS stock to include value-added and/or functional additives.

Presently known or proposed methods to recycle waste impregnated thermoplastics only allow for partial recycling of waste expandable plastic materials and their components. For example, U.S. Pat. No. 6,310,109 B1 discloses dissolving up to 30% of recycled expanded PS material in styrene monomer prior to suspension polymerization; however, it is expected that the dissolved polystyrene and its various additives may interfere with the subsequent suspension polymerization. In addition, the presence of comonomers, especially crosslinking ones, may interfere with the dissolution of the recycled EPS in styrene monomer.

Similarly U.S. Pat. No. 8,173,714 B1 discloses a process for preparing EPS granulate containing athermanous particles and having a reduced thermal conductivity by suspension polymerization in which about 13% of oversize and undersize fractions of EPS (expandable micropellets or granulate containing substantial amounts of expansion agent) were dissolved in styrene prior to its suspension polymerization. It is expected that the expansion agent is lost during the dissolution process and the dissolved polystyrene and its various additives may interfere with the subsequent suspension polymerization. Therefore there is a need for methods to recycle waste expandable plastic materials more completely and more efficiently than is possible by means of dissolving small amounts of the waste expandable plastic material in its monomer prior to carrying out a suspension polymerization step.

WO 03/053651 A1 generically discloses and claims an extrusion process for the production of granulates of expandable thermoplastic polymers that allegedly may contain up to 30% of recycled product or waste products of previous processings; however, no specific disclosure of how this may be done, especially without loss of expansion agent, or examples of such processes are actually provided.

EP1925418A1 discloses a process for the continuous melt impregnation of a thermoplastic to produce foamed or foamable granulates from a polymer melt and a recycled polymer melt, wherein at least one part of the recycled polymer melt is produced from recycled, propellant-containing polymer granulates. The recycled, propellant-containing polymer granulates are melted in an extruder, and propellant contained in the recycled, propellant-containing polymer granulates is removed from the recycled polymer melt in a degasification apparatus. At least one additive is added in metered form to the recycled polymer melt downstream of the degasification apparatus. The polymer melt is either produced directly in a polymerisation plant, which includes a reactor and a degasification apparatus, or by the melting of polymer granulate in a melting apparatus. The polymer melt is loaded with a fluid propellant, so that a propellant-containing polymer melt is obtained, with the propellant being dispersed in a following mixing apparatus and homogenized. The propellant-containing polymer melt and the additive-containing recycled polymer melt are then mixed and homogenised in a following mixing apparatus to form a homogeneous polymer melt that is then subjected to a granulating step, which is carried out by means of a granulator. Although useful, the melt method and plant of EP '418A1 allows only for a partial recycling of propellant-containing granulates, as a conventional "virgin" melt is also required as a feed stream, and the propellant of the recycled, propellant-containing polymer granulates is lost in the degasification step.

In conclusion, it would be desirable to have an improved process to recycle expandable plastic materials. For example, it would be desirable to be able to process an entire feedstock consisting essentially of only recycled expandable plastic material. Also desirable would be to have a simple and direct melt process for preparing formulated and/or upgraded expandable plastic material grades from a feedstock of expandable plastic granulates, such as that obtainable from the conventional suspension polymerization or melt impregnation processes. It would also be desirable to have a granulated expandable plastic material, an extruded, formed and expanded plastic material, or a molded expanded plastic article obtainable or obtained by such processes.

SUMMARY OF THE INVENTION

Starting from this state of the art, it is an object of the invention to provide an improved process to recycle and/or formulate expandable plastic materials, that does not suffer from the previously mentioned deficiencies, particularly a lack of complete and efficient recycle of the expandable plastic material and a significant loss of expansion agent. An additional object is to provide a process that does not necessarily require non-recycle or "virgin" feedstreams. Further objects of the invention include providing a granulated expandable plastic material, an extruded, formed and expandable plastic material, or a molded expanded plastic article obtainable or obtained by the process of the invention.

According to the invention, these objects are achieved by a process to recycle expandable plastic materials using a system comprising the following units in fluid communication with each other and in the following sequence:
- an extruder unit
- a mixer-heat exchanger unit the system further comprising a melt pump unit also in fluid communication with previous said units, wherein the melt pump unit is located either upstream of the mixer-heat exchanger unit and downstream of the extruder unit OR the melt pump unit is located downstream of the mixer-heat exchanger unit, said process comprising the steps of:
- melting a feedstream comprising an expandable plastic material containing a first expansion agent in the extruder unit to form a molten expandable plastic material,
- cooling the molten expandable plastic material in the mixer-heat exchanger unit;
- controlling the melt pressure of the molten expandable plastic material by means of the melt pump unit, and subsequently either (i) granulation of the molten expandable plastic material by means of a granulation unit to form a granulated expandable plastic material, (ii) extrusion of the molten expandable plastic material by a die to a controlled reduced pressure, preferably atmospheric pressure, to yield an extruded, formed and expanded plastic material, OR (ii) injection molding of the molten expandable plastic material by means of an injection molding unit to form a molded expanded plastic article, wherein the expandable plastic material comprises at least 40%, more preferably 60%, even more preferably 90% by weight, and most preferably essentially all of the feedstream, wherein the system does not have a degasification unit, and wherein the first expansion agent is not degassed during a melt processing in the system such that the first expansion agent is substantially contained in the granulated expandable plastic material or used to form either the extruded, formed and expanded plastic material or the molded expanded plastic article.

The inventors have surprisingly found that said process may be used for both the full recycling of purely recycled feedstocks of expandable plastic materials and/or for the formulation of or upgrading of feedstocks of pre-existing expandable plastic granulate materials. Thus the recycling and/or formulating process is significantly improved over those of the prior art. In particular, the process of the invention has only very little loss of expansion agent, and therefore in many embodiments little or no dosing of additional expansion agent is required. In addition, not only may the expansion agent be recycled in the present invention, but also any additives contained in the expandable plastic material to be recycled. Furthermore since little or no expansion agent must be dosed and mixed to the expandable plastic material used as a feedstock, an overall lower processing temperature profile and melt temperature may advantageously be used. For example, temperature-sensitive additives such as flame retardants may be dosed directly, for example, in the extruder unit, without requiring special additional equipment such as a side extruder or a second cooler or special flame retardant stabilizer packages.

In the case of formulating or upgrading a feedstock of expandable plastic granulates, such as that obtainable from the conventional suspension polymerization or melt impregnation processes, the scale of the plant and production lines may be considerably reduced because the feedstock already contains expansion agent. Furthermore feedstocks of expandable plastic granulates may be produced conveniently and centrally in large-scale and efficient production facilities, and then customized or upgraded formulations or grades—even in relatively small quantities—may be later produced as customer demand requires. Such formulating and upgrading facilities may then conveniently be distributed geographically in regional locations to meet local market and product requirements. In addition, since the recycling and/or formulating and/or upgrading process does not require the suspension polymerization step, the use of solvents is avoided.

This lack of requiring extensive thermal processing and high processing temperatures is a result of the use of a feedstock of an expandable plastic material, preferably in the form of granulates, to the extruder unit where it is molten and further processed. In some embodiments, non-expandable plastic material may be used as part of the feedstock to the extruder, for example, either as granulate or in the form of a melt stream. However the feedstream of plastic material to the extruder will preferably be at least 40%, more preferably 60%, even more preferably 90% by weight, and most preferably essentially only expandable plastic material. In a particularly preferred embodiment, only expandable plastic material in the form of granule is used as a feedstream to the extruder.

In certain embodiments of the process, either only the granulation or extrusion takes place. In other embodiments, a granulation will take place followed by a subsequent injection molding. In still other embodiments, a buffer system will be provided in a location between the mixer-heat exchanger and the injection molding unit so as to facilitate the transition between the typically continuous or semi-continuous extrusion process and the typically non-continuous or batchwise injection molding process.

A granulated expandable plastic material is obtainable, preferably obtained, by the process of the invention in which the granulation unit is present, wherein the granulation unit is an underwater or strand granulator, and granulation of the filtered molten expandable plastic material is carried out to form a granulated expandable plastic material, preferably containing one or more additives, more preferably at least one flame retardant compound and at least one of the group consisting of a melt stabilizer, a synergist, an infrared reflector, an infrared absorber, a pigment, a nucleating agent, and a wax.

The third further object of an extruded, formed and expanded plastic material is obtainable, preferably obtained, by the process of the invention in which the molten expandable plastic material or the filtered molten expandable plastic material is extruded by a die to a controlled reduced pressure, preferably atmospheric pressure, to yield an extruded, formed and expanded plastic material, preferably containing one or more additives, more preferably at least one flame retardant compound and at least one of the group consisting of a infrared reflector, an infrared absorber, a pigment, a nucleating agent, and a wax. In many embodiments, it will be preferred that the expandable plastic material in the feedstream of the process is obtained from a suspension polymerization method, as that method is conventionally most widely used for the production of expandable plastic granulates.

These further objects of the invention share the advantages obtained by the process of the invention, namely full recycling of purely recycled feedstocks of expandable plastic materials and/or the formulation of or upgrading of feedstocks of pre-existing expandable plastic granulate materials with only very little loss of expansion agent, and therefore allowing the advantageous use of an overall lower processing temperature profile and melt temperature. In certain specific embodiments, the maximum melt temperature in the process is 210, preferably 200, more preferably 190, even more preferably 180, and most preferably 175° C. As a result of this mild processing in the present invention, there is only a limited decrease in the Mw and Mn and only a limited increase in the Mw/Mn of the expandable plastic material during processing. In some embodiments, the decrease in Mn is less than 40%, preferably 30%, and the decrease in Mw is less than 20%, preferably 15%, and the increase in Mw/Mn is less than 35%, preferably 25%.

In preferred embodiments, the molten expandable recycled plastic material, the filtered molten expandable plastic material, the granulated expandable plastic material, or the extruded, formed and expanded plastic material of the invention has molecular weight properties of a Mw of 150-250 kDalton (absolute) and a Mw/Mn of between 2.1 and 2.5 when measured by GPC using THF as solvent. Such molecular weight properties impart favourable processing and/or mechanical properties to the resulting products.

In a preferred embodiment of the process and system of the invention, an optional expansion agent metering device is absent from the system and no optional addition of optional additional expansion agent is made. This embodiment has a significant advantage in simplifying the system and process of the invention, thus reducing investment costs and maintenance operations and eliminating the cost, complexity and potential hazards of gaseous raw materials. These benefits are attributable to the use of an expandable plastic material as primary or even sole feedstream in the process of the invention.

In one embodiment of the process of the invention, one or more optional static mixer unit(s) are present and an additional mixing of the molten expandable plastic material by means of the optional static mixer unit(s) is carried out and a melt filtration unit is present and a filtering of the molten expandable plastic material by means of the melt filtration unit to form a filtered molten expandable material is carried out prior to the subsequent granulation, extrusion, or injection molding. In still other embodiments, further additional static mixer units may be present. A static mixer unit is particularly beneficial when adding additional components such as expansion agents because the static mixer enhances the dispersion of the expansion agent or other component in the molten expandable material. A melt filtration unit is particularly beneficial for use with feed streams of recycled impregnated granulate, which may be contaminated with particulates, and use of a filter will reduce the plugging and thus cleaning and maintenance of the die when using underwater granulation and potentially also strand granulation with small strand die hole sizes.

In another embodiment of the process of the invention, the optional expansion agent metering device is present and the optional addition of additional expansion agent by means of the optional expansion agent metering device is carried out. This embodiment is advantageously used when the waste expandable plastic material to be recycled and fed to the extruder unit for melting is old and has aged and lost expansion agent. In various embodiments, the amount of additional expansion agent added will be less than 4, more preferably 3, and even more preferably 2, most embodiments 1 wt %, based on the mass of the total polymer melt. Alternatively this embodiment may be used when recycling, formulating or upgrading expandable plastic material for another application requiring higher levels of expansion agent or when it is desired to add a co-expansion agent not present in the expandable plastic material feed.

In a specific embodiment of the above process embodiment, the expansion agent metering device is embodied so as to inject the optional expansion agent into the extruder unit, preferably a twin-screw extruder. Injecting into the extruder unit for dispersion and mixing without the use of static mixers requires less investment and allows for a potentially smaller footprint due to the lack of static mixers. A twin-screw extruder is preferred because of its additional dispersion and shear mixing relative to single-screw extruders.

However the use of the extruder unit instead of static mixer(s) for dispersion and mixing of the optional expansion agent will often be less flexible in terms of the processing window and required screw design for the process. Therefore in an alternative embodiment, the optional static mixer unit(s) is/are present and optional additional mixing of the molten expandable plastic material by means of the optional static mixer unit(s) is carried out, and the expansion agent metering device is embodied so as to inject the optional expansion agent into and/or before the static mixer unit(s). In a particularly preferred embodiment, at least two static mixer units are present, wherein in a first static mixer unit a dispersing step is carried out and which subjects the mixture to intensive mixing; and wherein in a second static mixer unit a retaining step is carried out and which subjects the mixture to less intensive mixing (homogenization) than in the first static mixer unit. This embodiment advantageously provides sufficient time for dissolution and mixing of the expansion agent in the molten polymer.

According to a specific embodiment of the process in which the optional expansion agent is injected, it comprises one or more expansion agents, preferably an inert gas, a methylol, methyl formate, a pentane, a butane or their mixtures. These expansion agents are less harmful to the environment.

In another embodiment of the process, a masterbatch is added to the extruder unit, preferably a single-screw extruder. Single-screw extruders lack the dispersion and mixing of twin-screw extruders, and therefore masterbatches will conveniently be used to enhance the dispersion and mixing in the addition of additives by single-screw extruders. Masterbatches allows the processor to formulate or upgrade the expandable plastic material economically during the process of the invention. Additive masterbatches may modify various properties of the base expandable plastic material, such as its ultraviolet light resistance, flame retardance, anti-static, lubrication, anti-slip, corrosion inhibition, anti-microbial, anti-oxidation, extrusion, or phosphorescence properties. Preferred additives in the present invention include infrared absorbers or reflectors (e.g. graphite), nucleating agents, and flame retardants.

In another embodiment having similar advantages to the previous embodiment, an additive is added to the extruder unit, preferably a twin-screw extruder. Due to its favourable dispersion and shear mixing properties, a twin-screw extruder can flexibly add additives without requiring the use of master batches.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more granulated expandable recycled plastic material, or extruded, formed and expanded plastic material, or molded expanded plastic article claims or the subject matter of a mixture of one or more process claims and material or article claims. By analogy, the subject matter of any one material claim or article may be combined with the subject matter of one or more other material or article claims or the subject matter of one or more process claims or the subject matter of a mixture of one or more material or article claims and process claims. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned process embodiments may be combined with the subject matter of one or more of the other above-mentioned material embodiments or vice versa without limitation so long as technically feasible.

BRIEF DESCRIPTION OF THE DRAWINGS

The invention will be explained in more detail hereinafter with reference to various embodiments of the invention as well as to the drawings. The schematic drawings show.

Table 1 Table comparing the molecular weight properties of expandable plastic materials (EPS) before and after the process of the invention.

DETAILED DESCRIPTION OF THE INVENTION

Definitions

As used in the specification and claims of this application, the following definitions, should be applied:

"a", "an", and "the" as an antecedent may refer to either the singular or plural unless the context indicates otherwise.

An "expandable plastic material" is a plastic material containing a substantial amount of expansion agent, which is an amount detectable by means of headspace gas chromatography. In some embodiments, the amount of expansion agent in the expandable plastic material is at least 1 wt %, preferably 4 to 8 wt %. Therefore an expandable plastic material is distinguished from an expanded or already-foamed product (containing at most only low levels of residual expansion agent) obtained from the molding or extrusion of an expandable plastic material such as EPS.

One skilled in the art will understand that expandable plastic granulates obtained from the conventional suspension polymerization and melt impregnation processes are readily distinguishable from each other by their appearance and chemical composition.

Granulates from the suspension polymerization process are very nearly perfectly spherical in shape, whereas the granulates from melt impregnation processes are less perfectly spherical in shape because they are prepared using underwater or strand granulators. Furthermore the granulates may be distinguished from each other because the granulates from the underwater or strand granulation process (melt impregnation processes) exhibit cut lines on their surface from contact with the cutter blade or knife, whereas such cut lines are absent from the surface of the granulates prepared by the suspension polymerization method.

In addition, special surfactant systems are known to be used to stabilize the expandable plastic granulate produced by the suspension polymerization method. Such surfactants may also be referred to by other terms such as suspension stabilizers, suspending agents, stabilizers, or protective colloids. These surfactants are usually used together with a Pickerings stabilizer (or protective colloid), as described in the examples of U.S. Pat. No. 8,173,714B2. Alternatively they may be be used together with an anionic surfactant or alone. Important to note is that such surfactant systems are not used in the melt impregnation process to prepare expandable plastic granulates.

Some representative surfactant systems and their components are the 'organic suspending agents, stabilizers and anionic surfactants' disclosed in U.S. Pat. No. 7,825,165B2, the 'stabilisers or suspending agents' disclosed in WO2014/009145A1, the 'protective colloid' disclosed in DE3331570A11, and the 'suspension stabilizers and protective colloids' disclosed in U.S. Pat. No. 4,036,794A1.

Therefore expandable plastic granulates prepared by suspension polymerization methods and thus containing surfactants and/or their residues are chemically distinct from those prepared by melt impregnation methods lacking those surfactants and/or their residues. These surfactants and their residues may be detected by conventional analytical methods such as those disclosed in "Additives in Polymers: Industrial Analysis and Applications", by Jan C. J. Bart, published by John Wiley & Sons in 2005 (ISBN: 978-0-470-85062-6).

An "expansion agent" is a substance which is capable of producing a cellular structure via a foaming process in a plastic material that undergoes hardening, solidification or phase transition. It is known conventionally as a chemical or physical blowing agent. In the present invention, the expansion agent will preferentially be a physical blowing agent.

"the first expansion agent is substantially contained in the granulated expandable plastic material or used to form either the extruded, formed and expanded plastic material or the molded expanded plastic article" means that little expansion agent will be lost in the process of the invention. In one embodiment, the loss of expansion agent will be less than 1, preferably 0.8, more preferably 0.6, and most preferably less than 0.5 wt % measured based on the weight of the expandable plastic material, e.g. the granulates, and relative to the content of the first expansion agent introduced into the process by means of the expandable plastic material in the feedstream.

For example, in several embodiments the expandable plastic material in the feedstream will have a content of expansion agent of about 4 to about 8, preferably about 5 to about 6 wt %, and the granulated expandable plastic material produced will have an expansion agent content that is about 0.05 to about 0.8 wt % lower when the feedstream consists essentially of only the expandable plastic material and no additional expansion agent is added during the process.

The amount of loss of first expansion agent may be readily determined by comparing the amount of the first expansion agent with the total amount of expansion agent present in the granulated expandable plastic material produced by the process, taking into account, for example, the addition of any additional expansion agent to the process and the amount of any non-expandable plastic material in the feedstream and amounts of additives added etc. For embodiments in which the product is directly extruded or injection molded, the amount of expansion agent may be measured by taking samples of the molten expandable plastic material shortly before the die or the injection molding unit, for example, by means of a sampling port.

As an example, gas chromatographic cell gas analysis may be used to measure the composition of expansion agent in the various product or intermediate samples, as well as its content in modified analytical methods. Specifically multiple headspace extraction capillary gas chromatographic (MHE-CGC) methods for the quantitative, accurate, and rapid determination of volatile components in solids such as plastics have been developed. In particular, ASTM D4526 provides a Standard Practice for Determination of Volatiles in Polymers by Static Headspace Gas Chromatography. Alternatively, thermal gravimetric analysis couples with FTIR or MS may also be used for the quantitative analysis of volatiles in plastics. Several conventional methods for the quantitative analysis of volatile species such as expansion agents are disclosed in Additives in Polymers: Industrial Analysis and Applications, by J. C. J. Bart, published by John Wiley & Sons in West Sussex, UK in 2005 (ISBN 0-470-85062-0).

Alternatively the content of expansion agent may be measured indirectly by means of density measurements of the granulated expandable plastic material, extruded, formed and expanded plastic material or the molded expanded plastic articles produced by the process of the invention. Such densities will be measured according to either ISO 845 or ASTM D1622. The densities of these products may be compared then with the densities of products obtained with processes in which only virgin non-expandable plastic materials have been used as a feedstream and to which known amounts of expansion agent have been added. In addition, the content of expansion agent may be also measured indirectly by measuring the melt viscosity in the extruder unit or other points in the system and comparing those values with the melt viscosities of the comparable virgin non-expandable plastic materials under comparable process conditions of temperature, pressure and time etc. in which known amounts of expansion agent have been added.

It is noted that on-line Near Infrared (NIR) methods for the control of blowing agent content of polymer beads are known. For example, EP 1752236 B1 discloses such methods for controlling the blowing agent content of the polymer beads used to make patterns in the lost foam casting process. Therefore in one embodiment, on-line NIR measurements may be used to measure and control the content of expansion agent, for example, in the feedstream 101 and/or the molten expandable plastic material 110 so that a addition of additional expansion agent 80 may be made to ensure a specified level is achieved in the granulated expandable plastic material 130 or used to form either the extruded, formed and expanded plastic material 140 or the molded expanded plastic article 150. In alternative embodiments the content of expansion agents may be indirectly measured and controlled by means of on-line rheometric measurements.

In the present invention, the content of first expansion agent contained in an expandable plastic material (e.g. before, during or after completion of the process of the invention) is defined as the content as determined by headspace gas chromatography.

A "masterbatch" in the present application is defined as a solid (granule or dry blend) or liquid additive for the expandable plastic material used for imparting specific properties to the expandable plastic material (additive masterbatch). Thus a masterbatch is typically a concentrated mixture of additives encapsulated during a thermal process into a carrier resin which is then cooled and granulated. Masterbatches find application in formulating and upgrading of plastic materials.

Numerical values in the present application relate to average values. Furthermore, unless indicated to the contrary, the numerical values should be understood to include numerical values which are the same when reduced to the same number of significant figures and numerical values that differ from the stated value by less than the experimental error of the conventional measurement technique of the type described in the present application to determine the value.

A process or system to recycle expandable materials means that the product of the process or produced by the system comprises at least a portion of recycled expandable materials. The recycled expandable material contains a first expansion agent, and it is typically off-spec material (e.g. too small or too large impregnated pellets). In any case the recycled expandable material already contains the first expansion agent, and it will generally be in the form of granulate or pellets. The first expansion agent is not specifically limited and it will generally be a conventional physical blowing agent such as a CFC (e.g. CFC-11), a HCFC (e.g. HCFC-22, HCFC-142b, HCFC-134a, or HFC-365mfc), a HCC, a HFC, hydrocarbons (e.g. isobutene, a butane, a pentane, isopentane, or cyclopentane), methyl formate, methylol, water, nitrogen, $CO_2$, or their combinations. The expandable plastic material in the feedstream will typically containing 1 to 10, preferably 2 to 9, more preferably 5 to 8 wt % physical blowing agent. Thus a recycled expandable material is part of a feedstream to the process and system.

In various embodiments, the intermediates, product of the process or produced by the system (i.e. the molten expandable material, the filtered molten expandable material, the granulated expandable material, or the extruded, formed and expanded plastic material, depending on the particular steps of the process and units of the system) will comprise at least 25, preferably 50, more preferably 75, even more preferably 90 wt %, most preferably essentially all of the product, as a recycled expandable material. Essentially all means that all of the wt % of the resin component of the product is from recycle material, thus neglecting the contribution of additives and/or expansion agents etc.

A process or system to formulate expandable plastic materials means that the product of the process or produced by the system comprises at least a portion of pre-existing expandable materials, such as that produced by the conventional suspension method for EPS. Thus one embodiment refers to upgrading a pre-existing stock expandable material to include value-added and/or functional additives. Therefore a pre-existing expandable material is a feedstock to the process and system. In any case the pre-existing expandable material already contains an expansion agent, and it will generally be in the form of granulate or pellets. In various embodiments, the intermediates or product of the process or produced by the system (i.e. the molten expandable material, the filtered molten expandable material, the granulated expandable material, or the extruded, formed and expanded plastic material, depending on the particular steps of the process and units of the system) will comprise at least 50, preferably 60, more preferably 75, even more preferably 90 wt %, most preferably essentially all of the product, as a pre-existing expandable material. Essentially all means that all of the wt % of the resin component of the product is from a pre-existing expandable material, thus neglecting the contribution of additives and/or expansion agents etc.

As discussed earlier, the feature of the process of the invention of full recycling of purely recycled feedstocks of expandable plastic materials and/or the formulation of or upgrading of feedstocks of pre-existing expandable plastic granulate materials with only very little loss of expansion agent, therefore allows the advantageous use of an overall lower processing temperature profile and melt temperature. This is because the presence of the first expansion agent 81 acts to reduce the viscosity of the molten plastic material in the extruder unit 10, and there milder temperature profiles and lower maximum melt temperatures are enabled. In certain embodiments the relative melt viscosity in the extruder unit 10 may be conveniently measured by means of an on-line rheometer connected directly to the extruder unit 10 by means of a port, such as a standard M18 port.

One skilled in the art will understand that combinations of both recycling and formulating expandable plastic materials is possible in which feedstreams of both recycled expandable material and pre-existing feedstock of expandable material are used. A characteristic of said process and systems in the above-discussed various embodiments is that a substantial portion or even essentially all of the feedstock contains a first expansion agent 81. Therefore many of these embodiments will require the addition of little or even no additional expansion agent 80.

Nonetheless in some embodiments, additional expansion agent 80 will be added, for example, to increase the loading of expansion agent in the molten expandable plastic material 110, for example in upgrading or formulating the feedstock for an application requiring a higher loading of expansion agent or because some expansion agent has been lost from the expandable plastic material 100 due to storage for longer times and/or at higher temperatures prior to starting the process of the invention. In some of these embodiments, the melt viscosity will be monitored on-line and additional expansion agent 80 will be added in an amount sufficient to maintain a constant desired melt viscosity. The additional expansion agent 80 is not specifically limited, and it will preferably be a physical blowing agent. In various embodiments in will be the same or different from the first expansion agent 81. In several embodiments it will preferably not be a CFC, HCFC, HCC, or HFC due to environmental considerations.

Figure 1:
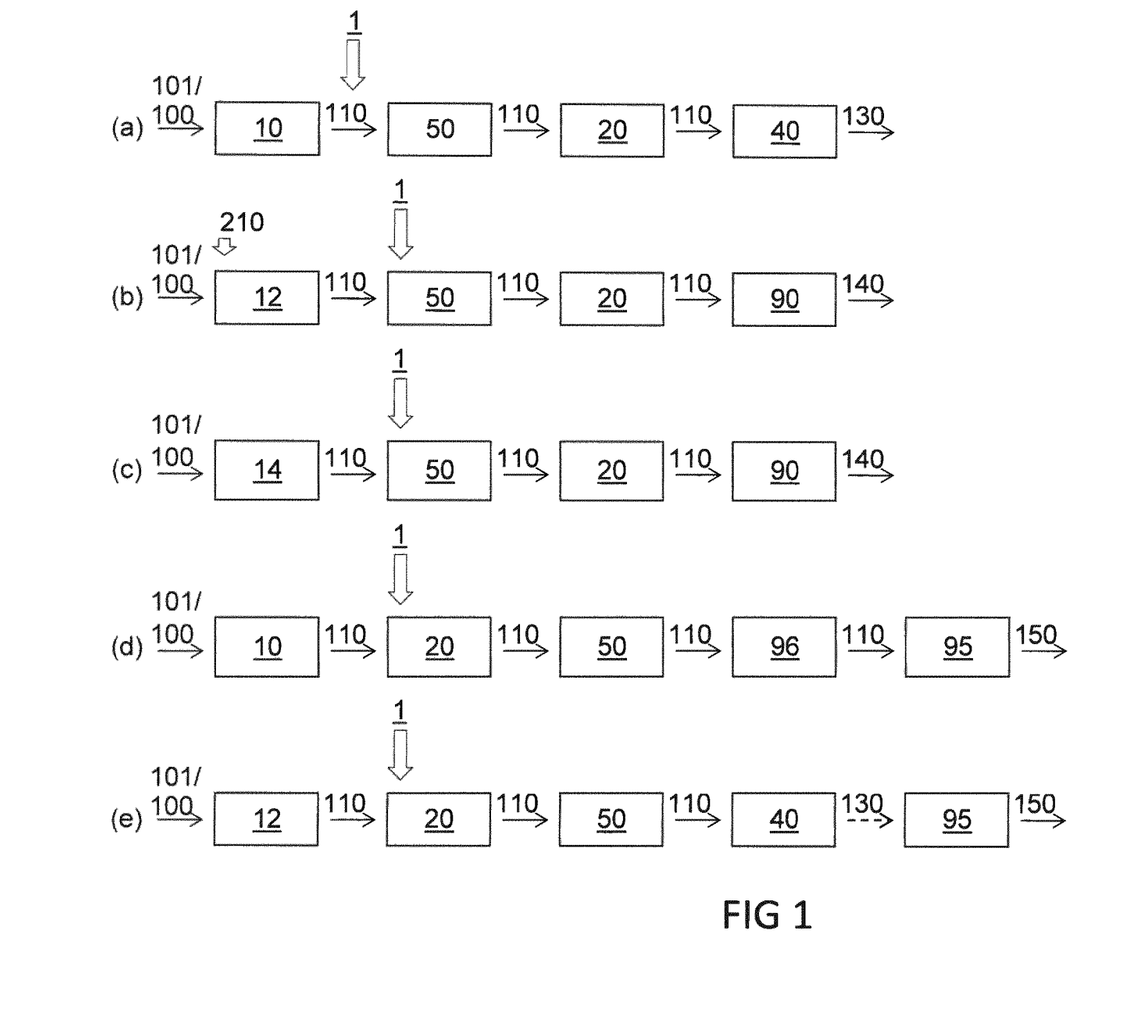
FIG. 1 shows a schematic view of five embodiments of a process and a system for recycling and/or formulating expandable plastic materials by making a granulated expandable recycled plastic material, an extruded, formed and expanded plastic material or a molded expanded plastic article, said system comprising an extruder unit, a mixer-heat exchanger unit, a melt pump unit, together with a die, granulation unit, and/or injection molding unit.

FIG. 1 shows a schematic view of three embodiments of a process and a system 1 for recycling and/or formulating expandable plastic materials by making a molten expandable material 110, which is then subsequently granulated, extruder or injection molded. These particular embodiments of the system 1 have only an extruder unit 10, a mixer-heat exchanger unit 20, and a melt pump unit 50 and either a granulation unit 40, die 90, or an injection molding unit 95. Thus these embodiments all lack the optional addition of optional expansion agent 80 by means of the optional expansion agent metering device 70. In addition, the embodiment in FIG. 1 (*b*) comprises the addition of an additive 210 to a twin-screw extruder 12, and the embodiment in FIG. 1 (*c*) comprises a single screw extruder 14.

In the embodiment in FIG. 1 (*d*), the molten expandable plastic material 110 is fed to the injection molding unit 95 by means of a buffer system 96. In the embodiment in FIG. 1 (*e*), the molten expandable plastic material 110 is first granulated to yield a 130 granulated expandable plastic material, which is then fed to an off-line injection molding unit 95.

The process and system of the invention are not specifically limited unless stated otherwise. Processes and systems for preparing expandable polymers, as well as their applications, are well-known and described, for example, in the Handbook of Polymer Foams edited by D. Eaves and published by Rapra Press of Shawbury, UK on 1 Jan. 2004 (ISBN 1-85957-388-6), and Handbook of Polymeric Foams and Foam Technology, $2^{nd}$ edition by D. Klempner, V. Sendijarevic and R. M. Aseeva published by Hanser Gardner Publ. of Munich, DE in April 2004 (ISBN 1-56990-336). Further disclosures of processes to prepare expandable polymer granulates are found in U.S. Pat. Nos. 4,243,717; 5,000,891; and 4,606,873.

Unless specifically indicated otherwise, the process of the invention may comprise steps and use polymers and raw materials as conventional and known the art. Processing steps may include drying, grinding, mixing, feeding, conveying, homogenising, and formulating. The polymers used as raw material for producing the molten expandable material 110 include polystyrene, polyolefins such as polyethylene or polypropylene, polyurethanes, ethylene vinyl alcohol, polyvinyl alcohol, polycaprolactone, polylactic acid, starch, polyethylene terephthalate, polybutylene terephthalate, polybutylene terephthalate elastomer, polycyclohexane terephthalate, polyethylene naphthalate, engineering thermoplastics such as polycarbonate or polyphenylene oxide, or mixtures and/or copolymers thereof.

Additives for use in the process and system of the invention include additives for friction reduction (slip agents), antioxidant, light stabilizing, anti-blocking, anti-static, anti-fogging/wetting, dispersion technology, process stabilizers, infrared absorber, infrared reflector, and nanoparticulate UV absorbers. Thus the molten expandable plastic material 110, filtered molten expandable plastic material 120, granulated expandable plastic material 130, and extruded, formed and expanded plastic material 140 may also contain conventional additives in effective amounts, such as dyes, fillers, stabilizers, flame retardants, synergists, nucleating agents, lubricants, antistatic agents, pigments, carbon black, graphite, aluminium, inorganic particles, athermanous particles, and waxes. Such additives can be added through side streams, thus enabling the processing of liquid and solid additives, as well as masterbatches. The necessary homogenization for uniform additive distribution within the product may favorably be achieved by the use of static mixers.

Thus in embodiments of the process of the invention, the molten expandable plastic material 110 or a filtered molten expandable plastic material 120 obtainable, preferably obtained, in the course of the process preferably contains one or more additives, more preferably at least one flame retardant compound and at least one of the group consisting of a melt stabilizer, a synergist, an infrared reflector, an infrared absorber, a pigment, a nucleating agent, and a wax. These formulated expandable molten plastic materials are then subsequently granulated, extruded, or indirectly or directly injection molded.

One skilled in the art will understand that a granulated expandable plastic material 130, obtainable, preferably obtained, by the process of the invention, preferably containing one or more additives, more preferably at least one flame retardant compound and at least one of the group consisting of a melt stabilizer, a synergist, an infrared reflector, an infrared absorber, a pigment, a nucleating agent, and a wax, wherein the expandable plastic material 100 in the feedstream 101 is obtained from a suspension polymerization method, is readily distinguishable from granulated expandable plastic materials known in the art. This is because these granulated expandable plastic materials in this embodiment will have the characteristics of both underwater granulation, such as a less perfectly spherical shape along with the presence of cut lines on their surface, combined with the chemical signature of the suspension polymerization process, such as a detectable component of a surfactant system or its residue. Thus the visual observation of cut lines on the surface together with the detection of a component of a surfactant system or its residue by chemical analytical methods may be used to identify the unique granulated expandable plastic material 130 of this embodiment.

The system of the invention may comprise units, sub-units and auxiliaries as conventional and known in the extrusion art including pumps, hoppers, feeders, heat exchangers, static mixers, blenders, inducers, control systems, electrical supplies, coolant and heating fluid supplies and distributions, pumps, valves, pipes, lines, reservoirs, drums, tanks, and sensors for measuring such parameters as flow, temperatures, pressures and levels. The process and the system of the invention may be conveniently controlled by means of a computer interface equipped with appropriate sensors. Extrusion systems and their components and processes of operation are known, for example, from Extrusion: The Definitive Processing Guide and Handbook, by H. F. Giles Jr, E. M. Mount III, J. R. Wagner, Jr, published by William Andrews of Norwich, N.Y. in 2005 (ISBN 0-8155-1473-5).

The extruder unit 10 is not specifically limited and it may be a melt kneader, single screw extruder 14, as in FIG. 1 (*c*), or a double-screw extruder 12, as in FIG. 1 (*b*). As shown in FIG. 1 (*b*), the process may include a step in which an additive 210 is added to the extruder unit 10, preferably a twin-screw extruder 12.

The mixer-heat exchanger unit 20 is not specifically limited, and it may be a shell and tube heat exchanger, a direct contact heat exchanger, a spiral heat exchanger, preferably it may be a tubular heat exchanger with mixing elements and plug flow, such as a Sulzer SMR static mixer-cooler.

Figure 2:
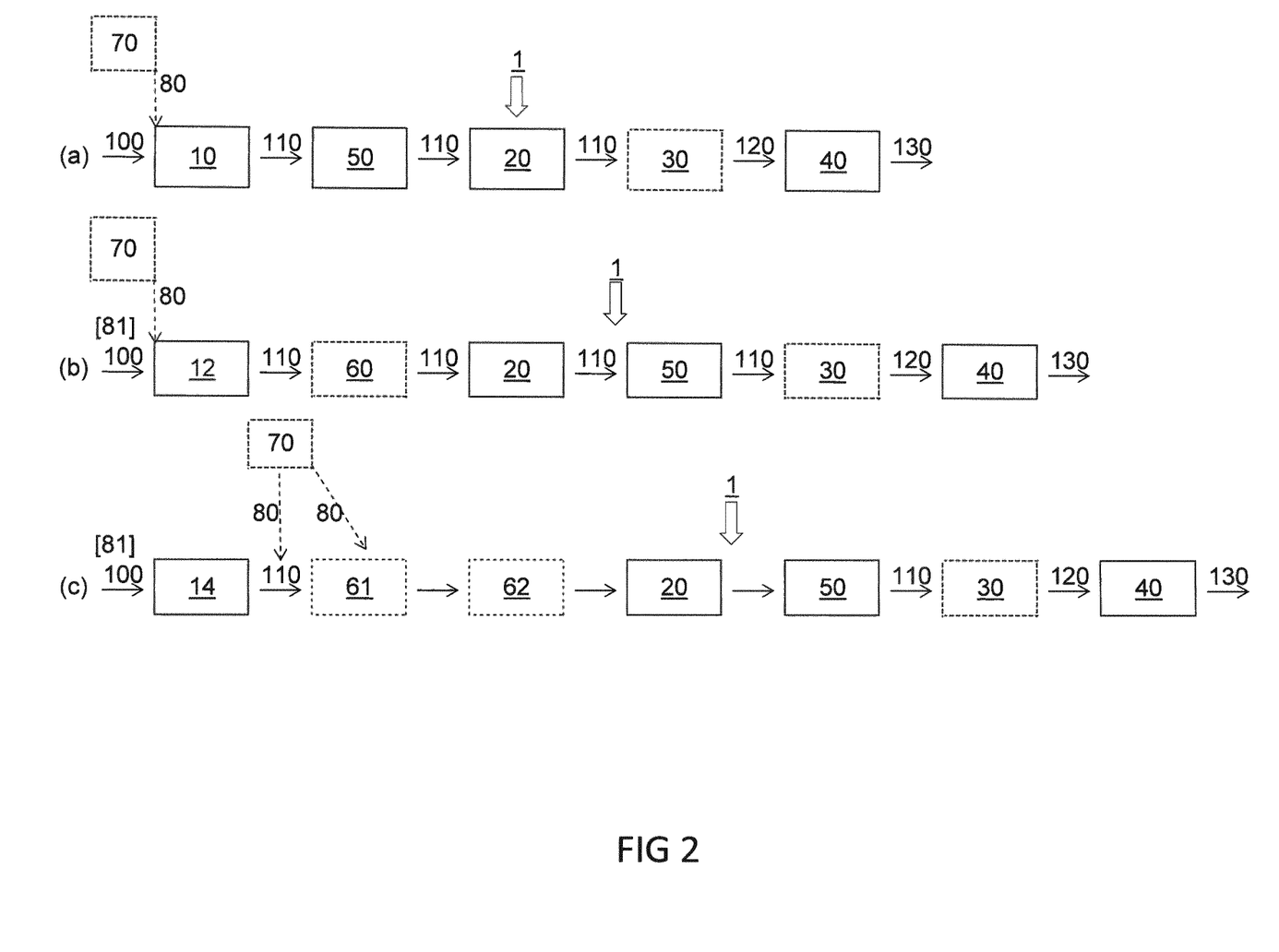
FIG. 2 shows a schematic view of three embodiments of a process and a system for recycling and/or formulating expandable plastic materials by making a granulated expandable recycled plastic material, said system comprising an extruder unit, a mixer-heat exchanger unit, a melt pump unit, and a granulation unit.
Figure 3:
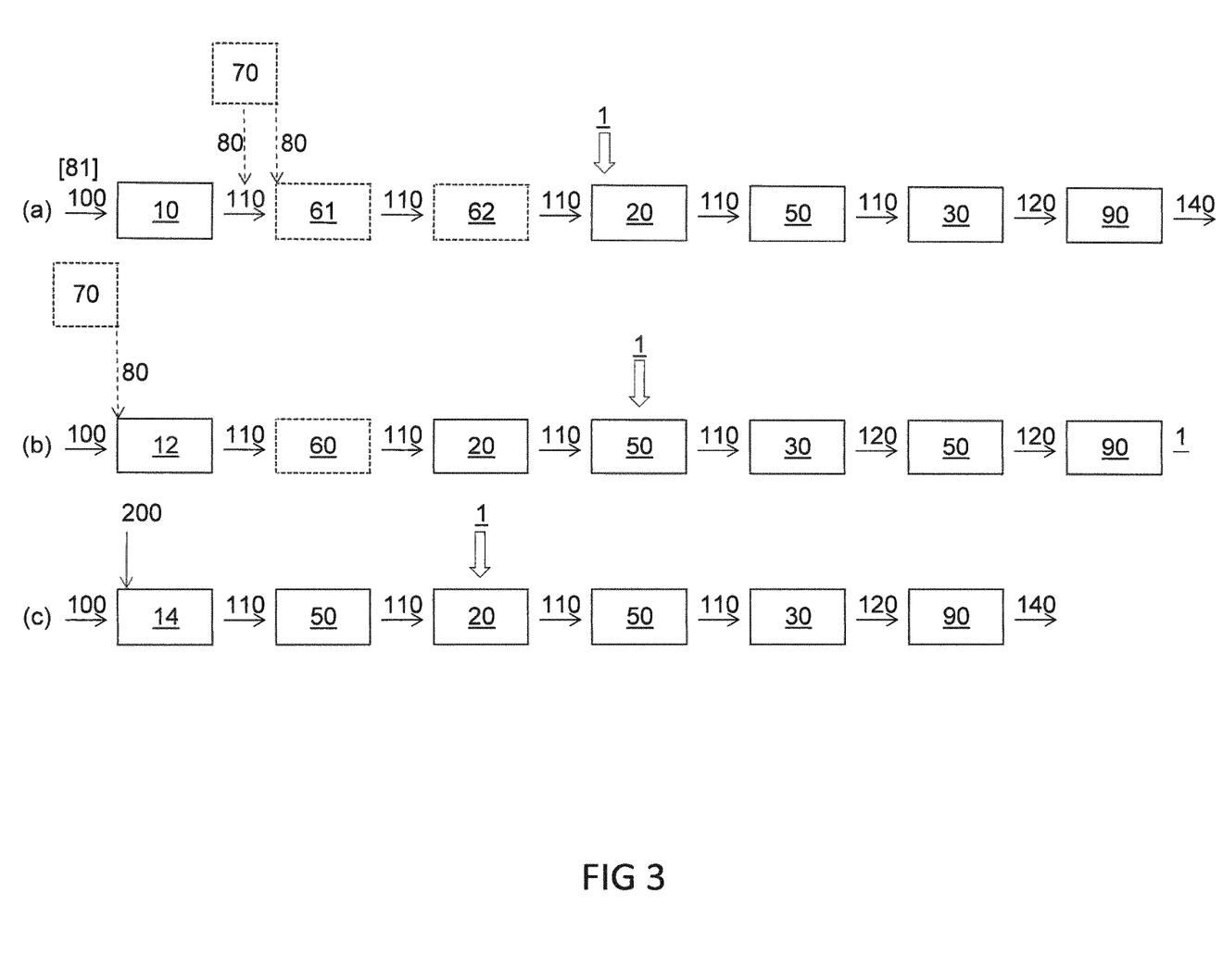
FIG. 3 shows a schematic view of three embodiments of a process and a system for recycling and/or formulating expandable plastic materials by making a extruded, formed and expanded plastic material, said system comprising an extruder unit, a mixer-heat exchanger unit, a melt pump unit, and a die.

The melt pump unit 50 is not specifically limited, and, for example, it may be a single or twin-shaft drive gear pump. It functions to ensure the necessary pressure build-up for allowing the optional melt filtration and pelletizing at a very low energy input. One skilled in the art will understand that the melt pump unit 50 location will generally be defined by the type of extruder used (ie. single screw or twin screw) as well as size of the system. Therefore, a preferred embodiment of FIG. 1*b* would include a twin screw extruder 12 with an additive port 210, mixer heat exchanger 20, melt pump unit 50 and granulation unit 40 or die 90. A preferred embodiment of FIG. 1*c* would include a second melt pump unit 50 after the single screw extruder 14. Similarly preferred embodiments of other systems based on single screw extruders 14 (e.g. FIGS. 2*c* and 3*c*) would have a second melt pump unit 50 after the single screw extruder 50. In the process and system of the invention, typical temperatures in the extruder unit 10 will be from minimum melt temperatures of at least about 110, preferably 120, more preferably 140, most preferably 150° C. Melt temperatures in the mixer-heat exchanger will typically be from about 150 to about 200, preferably from about 155 to about 190, more preferably from about 160 to about 180° C. In many embodiments, the melt temperature in the mixer-heat exchanger 20 will be about the same as or preferably less than that in the extruder unit 10. The difference between the maximum melt temperature in the extruder unit 10 and the maximum temperature of the melt in the mixer-heat exchanger unit 20 will be from 0 to 15° C. It is noted that melt temperatures may conveniently by measured by means of common flush mount melt thermocouples, for example, often installed in the extruder barrel, but occasionally mounted in the die adapter. Furthermore the embodiments of FIG. 1 may optionally have additional units and devices and steps (not shown) in the preparation of a molten expandable material. Such optional system features and process steps may include: one or more optional static mixer unit(s) 60 for the optional additional mixing of the molten expandable plastic material 110; optional expansion agent metering device 70 embodied so as to inject an optional expansion agent 80 into the extruder unit 10 and/or into or before one of the optional static mixer units 60; an optional melt filtration unit (30) for the optional filtering of the molten expandable plastic material 110 to form a filtered molten expandable material 120.

It is noted that the embodiments of FIG. 1 continue downstream to a granulation unit 40 such as an underwater granulator to make expandable granulates or a strand granulator to make foamed strands, or to a die 90 to make foamed tubes, plates or other forms, or they may continue indirectly or directly to an injection molding system 95 to indirectly (off-line) or even directly make foamed articles in an integrated and continuous or semi-continuous process.

FIG. 2 illustrates three example embodiments of the process and system to prepare a granulated expandable plastic material 130. Thus these embodiments all have a granulation unit 40 for producing a granulated expandable plastic material 130 from a filtered molten expandable plastic material 120. Furthermore they illustrate that an optional melt filtration unit 30 may be present for carrying out an optional filtering of the molten expandable plastic material 110 to form a filtered molten expandable material 120. In the example embodiments (a) to (c) there is an addition of optional additional expansion agent 80 by means of an optional expansion agent metering device 70. In embodiment (a), the addition of additional expansion agent 80 is to the extruder unit 10, and in embodiment (b), the addition is to a twin-screw extruder 12.

In embodiment (c) of FIG. 2, the expansion agent metering device 70 is embodied so as to inject the optional additional expansion agent 80 both into and before a static mixer unit 60, particularly a first static mixer unit 61, wherein in a first static mixer unit 61 a dispersing step is carried out and which subjects the mixture to intensive mixing; and wherein in a second static mixer unit 62 a retaining step is carried out and which subjects the mixture to less intensive mixing (homogenization) than in the first static mixer unit 61. FIG. 2 (*b*) illustrates that optional static mixer unit(s) 60 may alternatively be used to simply provide additional mixing of the molten expandable plastic material 110, and the optional additional expansion agent 80 may be added earlier, as in this embodiment, or even not at all (not shown).

The embodiments in FIG. 2 illustrate also that the melt pump unit 50 may be located either upstream of the mixer-heat exchanger unit 20 and downstream of the extruder unit 10 as in FIG. 2 (*a*), or the melt pump unit 50 may be located downstream of the mixer-heat exchanger unit 20 and upstream of the granulation unit 40 (or alternatively a die 90 or injection molding unit 95), as in FIGS. 2 (*b*) and (*c*).

FIG. 3 illustrates three example embodiments of the process and system to prepare an extruded, formed and expanded plastic material 140. Thus these embodiments all have a die 90 for producing a extruded, formed and expanded plastic material 140 from either a filtered molten expandable plastic material 120 or a molten expandable plastic material 110. The die 90 is not specifically limited, and it may be a coat hanger-type sheet die for sheet products, T-die or annular die for film products, annular die for pipe and tubing, open or closed profile extrusion die, or co-extrusion die. Dies and their design are disclosed, for example, in "Design of Extrusion Dies" by M. M. Kostic and L. G. Reifschneider in Encyclopedia of Chemical Processing, published in 2006 by Taylor & Francis (DOI: 10.1081/E-ECHP-120039324).

As in the embodiments of FIG. 2, the embodiments of FIGS. 3 (*a*) and (*b*) illustrate the addition of an additional expansion agent 80 by an expansion agent metering device 70 to a twin-screw extruder 12 or a first static mixer 61, respectively. The embodiments of FIGS. 3 (*b*) and (*c*) illustrate that the process and system of the invention may have more than one melt pump units 50, and the embodiment in FIG. 3 (*c*) illustrates that a masterbatch 200 may be added to the extruder unit 10, preferably a single-screw extruder 14.

EXAMPLES

The following examples are set forth to provide those of ordinary skill in the art with a detailed description of how the processes, molten expandable plastic material 110, the granulated expandable plastic material 130, the extruded, formed and expanded plastic material 140, and the molded expanded plastic article 150, and uses claimed herein are evaluated, and they are not intended to limit the scope of what the inventors regard as their invention.

In all of the examples the headspace gas chromatographic method was used for quantifying the content of expansion agent in the various feedstreams, as well as the granulated expandable plastic material produced. In some examples, the molecular weight properties of the granulated expandable plastic material produced was characterized by means of GPC measurements. The absolute molecular weight of the PS after processing was measured in tetrahydrofuran (THF) by gel permeation chromatography (GPC) using a Malvern GPCmax (Malvern Instruments Ltd., UK) with two I-MBHMW 3078 polar columns and an I-Guard 0748 polar organic guard column, and triple detector (refractive index, light-scattering, and viscometer). Dissolved samples (4 mg/ml) were filtered (ChromafilXtra PTFE syringe filter, pore size of 0.45 μm) before injection. THF, HPLC grade 99.9% with stabilizer, was purchased from Sigma Aldrich; it was used as received. Viscotek TDAmax was first calibrated with a narrow distributed polystyrene (PS) standard and validated by a broad distributed PS control; the error of the measurement of $M_n$ and $M_w$ of PS was below 5%.

Example 1

A system 1 comprising a twin screw extruder 12 equipped with gravimetric dosing equipment and a pentane injection port, a first and a second static mixer unit 61 and 62, a SMR-type heat exchanger as the mixer-heat exchanger unit 20, two melt pumps 50, a diverter valve, a police filter as the melt filtration unit 30, and an underwater granulator system as the granulation unit 40 was used in this example. The feedstream 101 consisted essentially of EPS containing approximately 5.4 wt % pentane and nucleating agents as the expandable plastic material 100. A pentane loss of approximately 0.4 wt % is observed in the granulated expandable plastic material 130, which had a content of about 5 wt % pentane when no additional expansion agent was added. In part of the trial, it was confirmed that the pentane content could be increased when an addition of pentane was injected into the twin screw extruder 12.

Example 2

Another system 1 also comprising a twin screw extruder 12 equipped with gravimetric dosing equipment and a pentane injection port, a first and a second static mixer unit 61 and 62, a SMR-type heat exchanger as the mixer-heat exchanger unit 20, two melt pumps 50, a diverter valve, a police filter as the melt filtration unit 30, and an underwater granulator system as the granulation unit 40 was used in this example. The feedstream 101 consisted essentially of EPS containing approximately 6 wt % pentane and nucleating agents as the expandable plastic material 100. This recycle material was further formulated by the addition of 3.5 wt % infrared absorber. The overall melt temperature was controlled to be between 170° C. and 172° C. A pentane loss of approximately 0.8-0.6 wt % pentane was observed with this processing, and thus the granulated expandable plastic material 130 had a content of about 5.2 to about 5.4 wt % pentane. A homogeneous dispersion of the infrared absorber was confirmed by optical microscopy, and micropellets with an average bead size of about 1.4 mm were produced.

Example 3

A system 1 comprising a twin screw extruder 12 equipped with gravimetric dosing equipment, a SMR-type cooler as the mixer-heat exchanger unit 20, one melt pump 50, a diverter valve, a melt filtration unit 30, and an underwater granulator system as the granulation unit 40 was used in this example. The feedstream 101 consisted essentially of EPS containing approximately 5 wt % pentane, nucleating agents, and an anti-static coating as the expandable plastic material 100. This recycle material was further formulated by the addition of 3 wt % infrared absorber. The melt temperature at the extruder was optimized to be between 165 and 171° C., at the diverter valve to be between 152 and 154° C., and thus a final melt temperature of 152 to 154° C. could be achieved. A homogeneous dispersion of the infrared absorber was confirmed by optical microscopy.

Example 4

Another system 1 comprising a twin screw extruder 12 equipped with gravimetric dosing equipment, a SMR-type cooler as the mixer-heat exchanger unit 20, one melt pump 50, a diverter valve, a melt filtration unit 30, and an underwater granulator system as the granulation unit 40 was used in this example. The feedstream 101 consisted essentially of EPS containing approximately 5-8 wt % expansion agent and 2-4 wt % flame retardant as the expandable plastic material 100. This recycle material was further formulated by the addition of 0.2 wt % nucleating agent and 4 wt % infrared absorber. The process was stable over a trial lasting approximately 12 hours, and the overall melt temperature was controlled to be between about 150° C. and about 155° C. An expansion agent loss of approximately 0.2-0.5 wt % is observed in the granulated expandable plastic material 130. A homogeneous dispersion of the infrared absorber was confirmed by optical microscopy, and micropellets with an average bead size of between about 1.35 and about 1.6 mm were produced.

Figure 4:
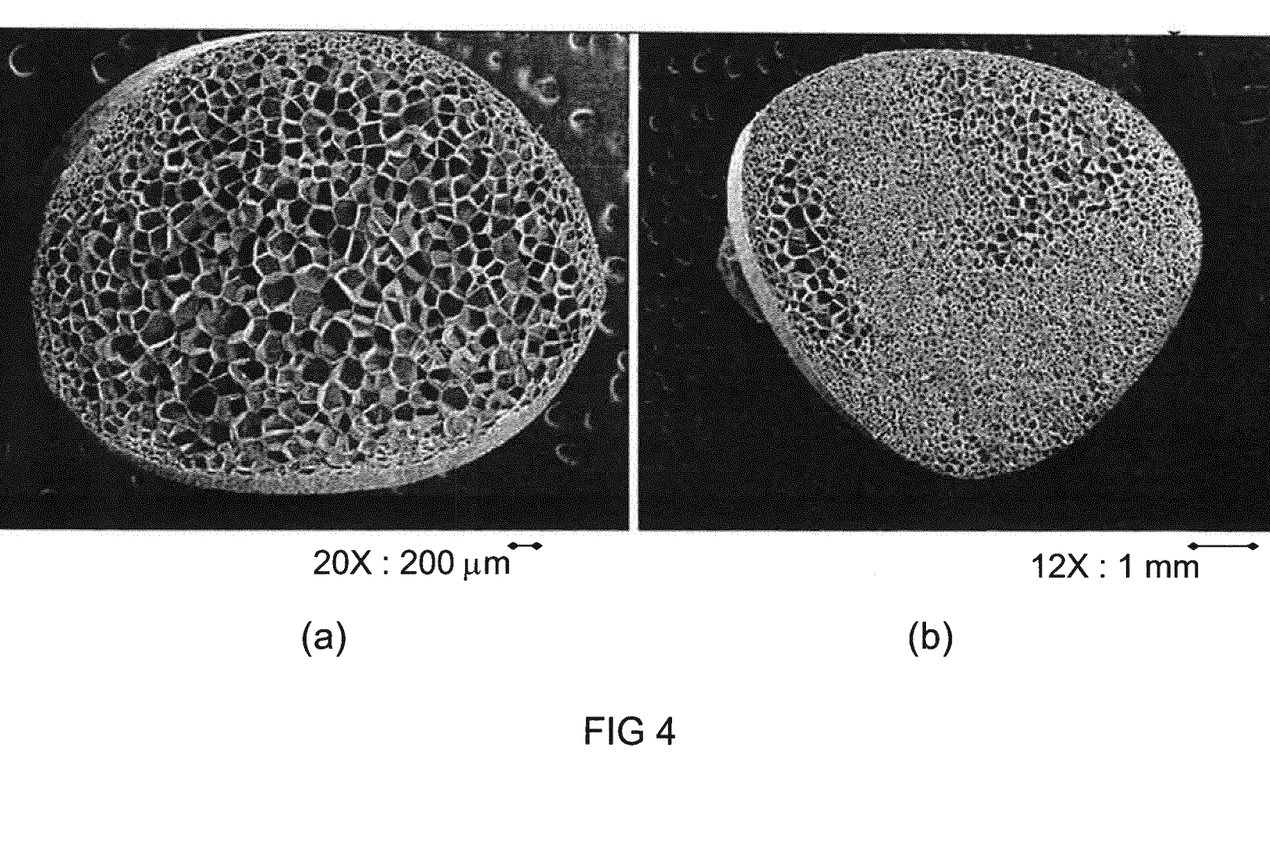
FIG. 4 Expanded pearls having densities of (a) 21 g/L (Mag=20×) and (b) 11 g/l (Mag=12×) produced from a granulated expandable plastic material produced by an embodiment of the process of the invention.

These micropellets were then expanded using conventional commercial prefoaming equipment to densities of 21 g/L and 11 g/L (FIG. 4). Thus this example demonstrates that recycle EPS may be successfully reprocessed as a feedstream 110 using the process of the invention to yield a granulated expandable plastic material 130, which may be successfully expanded and molded using conventional commercial equipment and processing conditions to give expanded and molded products substantially identical to those obtained from "virgin" EPS.

Table 1 provides an overview table comparing the molecular weight properties of some expandable plastic materials (EPS) before and after the process of the invention. It can be seen that the degradation of the expandable plastic material with processing to recycle the EPS is minimal, and the extent of molecular weight reduction and polydispersity index broadening of the polymer is dependent upon the processing conditions used. Processing conditions such as temperature and shear can be controlled to limit material degradation, particularly in the presence of a flame retardant, while allowing for excellent dispersion of additives, such as nucleating agents, or infrared absorbers/reflectors. The disclosed system 1 may be favorably operated to avoid the degradation of flame retardant present in the recycled expandable plastic material feedstock and/or flame retardant which is dosed as an additive.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

REFERENCE NUMBERS

1 system
10 extruder unit
12 twin-screw extruder
14 single-screw extruder
20 mixer-heat exchanger unit
25 degasification unit
30 optional melt filtration unit
40 granulation unit
50 melt pump unit
60 optional static mixer unit
61 first static mixer unit
62 second static mixer unit
70 expansion agent metering device
80 additional expansion agent
81 first expansion agent
90 die
95 injection molding unit
96 buffer system
100 expandable plastic material
101 feedstream
110 molten expandable plastic material
120 filtered molten expandable plastic material
130 granulated expandable plastic material
140 extruded, formed and expanded plastic material
150 molded expanded plastic article
200 masterbatch
210 additive

TABLE 1

| Material | Flame Retardant | Processing Conditions | Infrared Absorbing Additive Content [%] | Change In Mn [%] | Change in Mw [%] | Change In Mw/Mn [%] |
|---|---|---|---|---|---|---|
| EPS 2 | yes | low throughput; low shear | 4 | −19 | −10 | 14 |
| EPS 1 | no | low throughput; higher shear | 3 | −35 | −15 | 33 |
| EPS 1 | no | higher throughput; higher shear | 3 | −28 | −14 | 22 |
| EPS 3 | no | low throughput; low shear additional mixing elemerts | 3.5 | −26 | −16 | −4 |

The invention claimed is:

1. A process to recycle and/or formulate expandable plastic materials using a system comprising the following process equipment in fluid communication with each other and in the following sequence:
   an extruder,
   a mixer-heat exchanger,
   the system further comprising a melt pump also in fluid communication with the extruder and the mixer-heat exchanger,
   wherein the melt pump (50) is located either (i) upstream of the mixer-heat exchanger and downstream of the extruder (10) OR (ii) downstream of the mixer-heat exchanger (20),
   said process comprising the steps of:
   melting a feedstream comprising an expandable plastic material containing a first expansion agent in the extruder to form a molten expandable plastic material,
   cooling the molten expandable plastic material in the mixer-heat exchanger;
   controlling the melt pressure of the molten expandable plastic material by means of the melt pump,
   and subsequently either:
   (i) granulating the molten expandable plastic material using a granulator to form a granulated expandable plastic material,
   (ii) extruding the molten expandable plastic material by a die to a controlled reduced pressure, to yield an extruded, formed and expanded plastic material, OR
   (iii) injection molding the molten expandable plastic material by of an injection molding to form a molded expanded plastic article, wherein the expandable plastic material comprises at least 40% by weight of the feed stream, wherein the system does not have a degasification unit and the first expansion agent is not degassed during a melt processing in the system such that the first expansion agent is substantially contained in the granulated expandable plastic material or used to form either the extruded, formed and expanded plastic material or the molded expanded plastic article;

wherein the system further comprises one or more static mixers and a melt filter, wherein the method further comprises the steps of:

mixing the molten expandable plastic material using the one or more static mixers, and filtering the molten expandable plastic material using the melt filter prior to (i) granulation, (ii) extrusion, or (iii) injection molding.

2. The process of claim 1, wherein the expandable plastic material comprises at least 60% by weight of the feedstream.

3. The process of claim 1, wherein the expandable plastic material comprises at least 90% by weight of the feedstream.

4. The process of claim 1, wherein the expandable plastic material comprises essentially all of the feedstream.

5. The process of claim 1, wherein an expansion agent metering device is absent from the system and no addition of additional expansion agent is made.

6. The process of claim 1, wherein an expansion agent metering device is present and an addition of additional expansion agent by means of the expansion agent metering device is carried out.

7. The process of claim 6, wherein the expansion agent metering device is embodied so as to inject the additional expansion agent into the extruder.

8. The process of claim 6, wherein one or more static mixers is present and additional mixing of the molten expandable plastic material by means of the one or more static mixers is carried out, and wherein the expansion agent metering device is embodied so as to inject the additional expansion agent into and/or before the one or more static mixers.

9. The process of claim 8, wherein at least two static mixers are present, wherein in a first static mixer a dispersing step is carried out and which subjects the molten expandable plastic material to intensive mixing; and wherein in a second static mixer a retaining step is carried out and which subjects the molten expandable plastic material to less intensive mixing than in the first static mixer.

10. The process of claim 6, wherein the additional expansion agent is injected and comprises an inert gas, a methylol, methyl formate, a pentane, a butane or their mixtures.

11. The process of claim 1, wherein a masterbatch is added to the extruder.

12. The process of claim 11, wherein the extruder is a single screw extruder.

13. The process of claim 1, wherein an additive is added to the extruder.

14. The process of claim 1, wherein the granulator is an underwater or strand granulator.

15. A granulated expandable plastic material, obtainable by the process of claim 1.

16. The granulated expandable plastic material of claim 15, containing one or more additives and at least one of the group consisting of a melt stabilizer, a synergist, an infrared reflector, an infrared absorber, a pigment, a nucleating agent, and a wax, wherein the expandable plastic material in the feedstream is obtained from a suspension polymerization method.

17. The granulated expandable plastic material of claim 15, containing at least one flame retardant compound.

18. The granulated expandable plastic material of claim 15, that is obtained by the process of claim 1.

19. The granulated expandable plastic material of claim 15, having molecular weight properties of a Mw of 150-250 kDalton, absolute, and a Mw/Mn of between 2.1 and 2.5.

* * * * *

UNITED STATES PATENT AND TRADEMARK OFFICE
CERTIFICATE OF CORRECTION

PATENT NO. : 11,000,979 B2
APPLICATION NO. : 15/120988
DATED : May 11, 2021
INVENTOR(S) : Fennessey et al.

Page 1 of 1

It is certified that error appears in the above-identified patent and that said Letters Patent is hereby corrected as shown below:

In the Claims

Column 18, Claim 1, Lines 66-67 should read:
...material to form a molded expanded plastic article...

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*